US009819827B2

(12) United States Patent
Tagaki

(10) Patent No.: US 9,819,827 B2
(45) Date of Patent: Nov. 14, 2017

(54) IMAGE FORMING APPARATUS

(71) Applicant: KYOCERA Document Solutions Inc., Osaka (JP)

(72) Inventor: Koji Tagaki, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/198,846

(22) Filed: Jun. 30, 2016

(65) Prior Publication Data

US 2017/0006183 A1    Jan. 5, 2017

(30) Foreign Application Priority Data

Jun. 30, 2015 (JP) .................. 2015-131512
Jun. 30, 2015 (JP) .................. 2015-131514

(51) Int. Cl.
*H04N 1/00* (2006.01)
*G06F 3/12* (2006.01)
(Continued)

(52) U.S. Cl.
CPC ......... *H04N 1/346* (2013.01); *G06Q 30/0225* (2013.01); *H04N 1/00816* (2013.01);
(Continued)

(58) Field of Classification Search
None
See application file for complete search history.

(56) References Cited

U.S. PATENT DOCUMENTS 6,747,752 B1 *  6/2004  Farago .................. G06F 3/1205
                                                      358/1.1
6,862,107 B1 *  3/2005  Kawai ................ H04N 1/00127
                                                      358/1.18
(Continued)

FOREIGN PATENT DOCUMENTS

JP        2011-114359 A        6/2011

OTHER PUBLICATIONS

Brett Green, Curtis Reese, John Hatten; "Flexible rebate value based on consumable usage rate"; Jan. 2004; Research Disclosure; database No. 477080; p. 1.*

*Primary Examiner* — Beniyam Menberu
(74) *Attorney, Agent, or Firm* — Hawaii Patent Services; Nathaniel K. Fedde; Kenton N. Fedde

(57) ABSTRACT

Provided is an image forming apparatus in which a user receives benefits in accordance with the number of printing sheets even if there is a copy on which the user don't want to print a discount coupon when printing a plurality of copies. The image forming apparatus includes a discount amount calculating part that calculates a total number of printing sheets by multiplying the number of print copies received by the operation part by the number of printing after all pages of the document is read out by the document reading part, a coupon image generating part that generates a coupon image on which a total discount amount is written, a margin area detecting part that detects a margin area larger than the coupon image from among image data of the document readout by the document reading part and identifies the readout margin area as a superimposing area, and a coupon image superimposing part that superimposes the coupon image on the superimposing area, wherein the discount coupon is issued by printing image data of the document on which the coupon image is superimposed.

7 Claims, 16 Drawing Sheets

(51) Int. Cl.
    *G06K 15/02*         (2006.01)
    *H04N 1/34*          (2006.01)
    *G06Q 30/02*        (2012.01)

(52) U.S. Cl.
    CPC ......... *H04N 1/00832* (2013.01); *H04N 1/342* (2013.01); *H04N 2201/0094* (2013.01)

(56) References Cited

U.S. PATENT DOCUMENTS

| | | | |
|---|---|---|---|
| 2002/0049638 A1* | 4/2002 | Ito | G06Q 30/0239 705/14.39 |
| 2002/0188504 A1* | 12/2002 | Whale | G06Q 10/087 705/14.41 |
| 2004/0039641 A1* | 2/2004 | Satomi | G06Q 20/20 705/14.64 |
| 2007/0086452 A1* | 4/2007 | Hikida | G06Q 10/107 370/389 |
| 2007/0091391 A1* | 4/2007 | Saito | H04N 1/3871 358/530 |
| 2007/0092281 A1* | 4/2007 | Saito | G03G 21/02 399/79 |
| 2009/0171750 A1* | 7/2009 | Zhou | G06Q 30/02 705/14.53 |
| 2011/0188061 A1* | 8/2011 | Miyamoto | G06K 15/16 358/1.12 |
| 2011/0282733 A1* | 11/2011 | Gnanasambandam | G06Q 30/02 705/14.44 |
| 2012/0284133 A1* | 11/2012 | Espela | G06F 3/1206 705/24 |
| 2014/0316877 A1* | 10/2014 | Snyder | G06Q 30/0235 705/14.35 |

\* cited by examiner

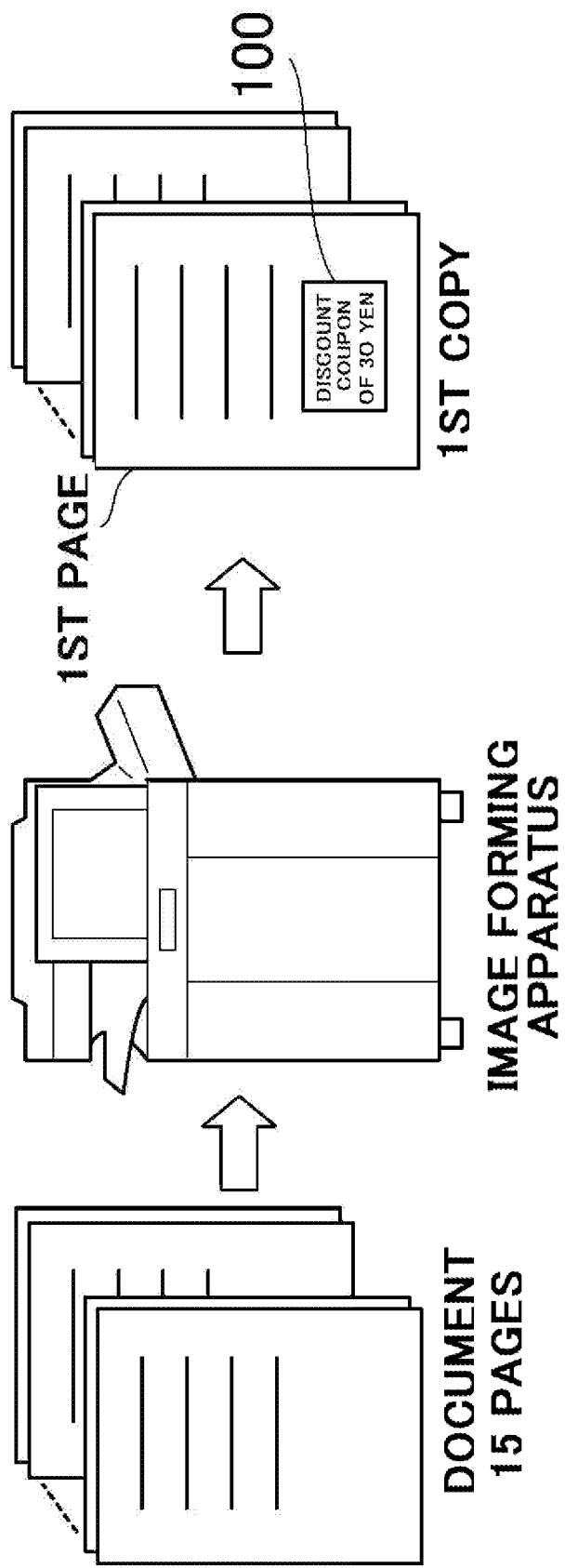

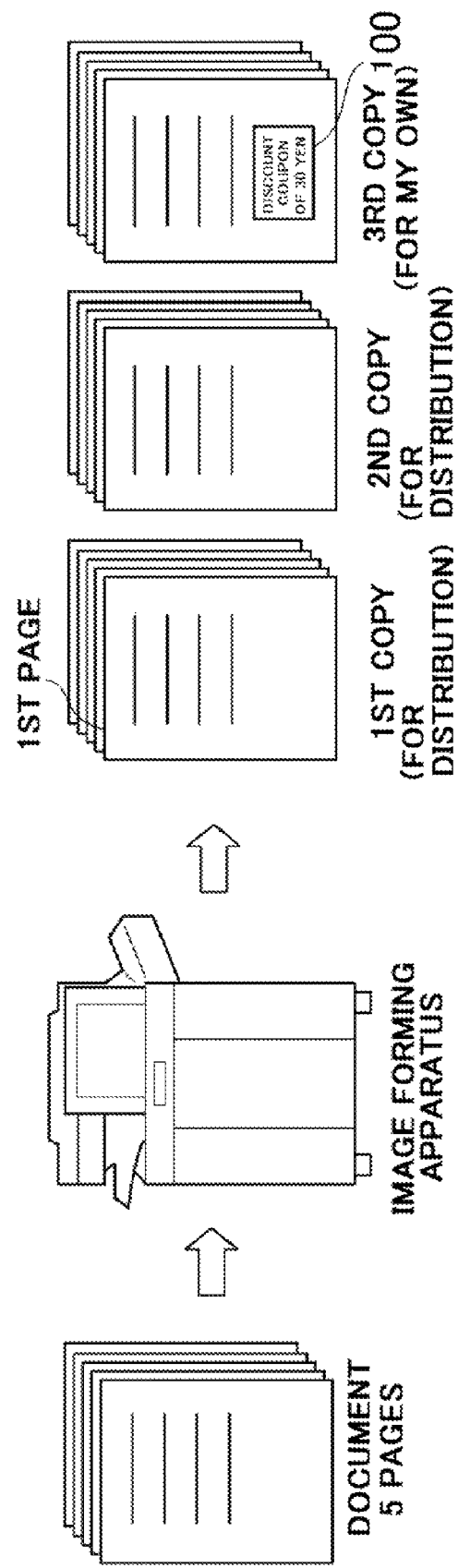

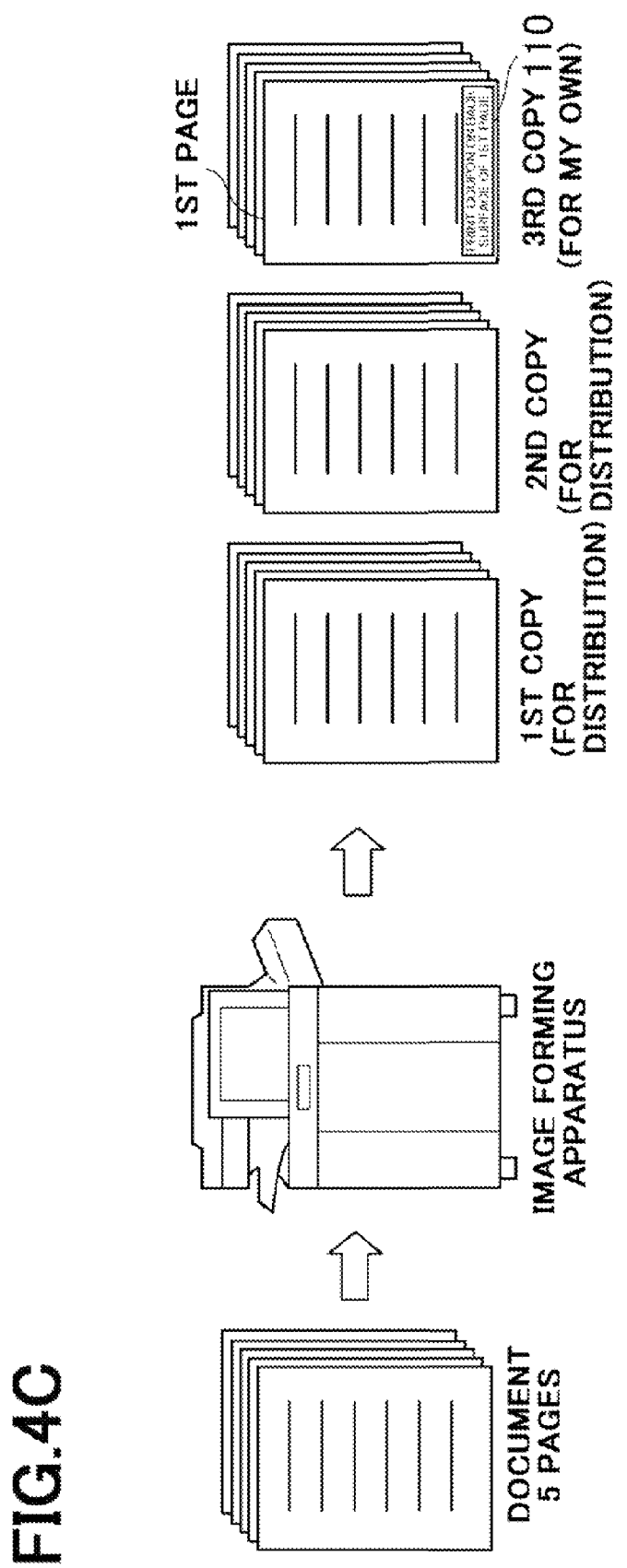

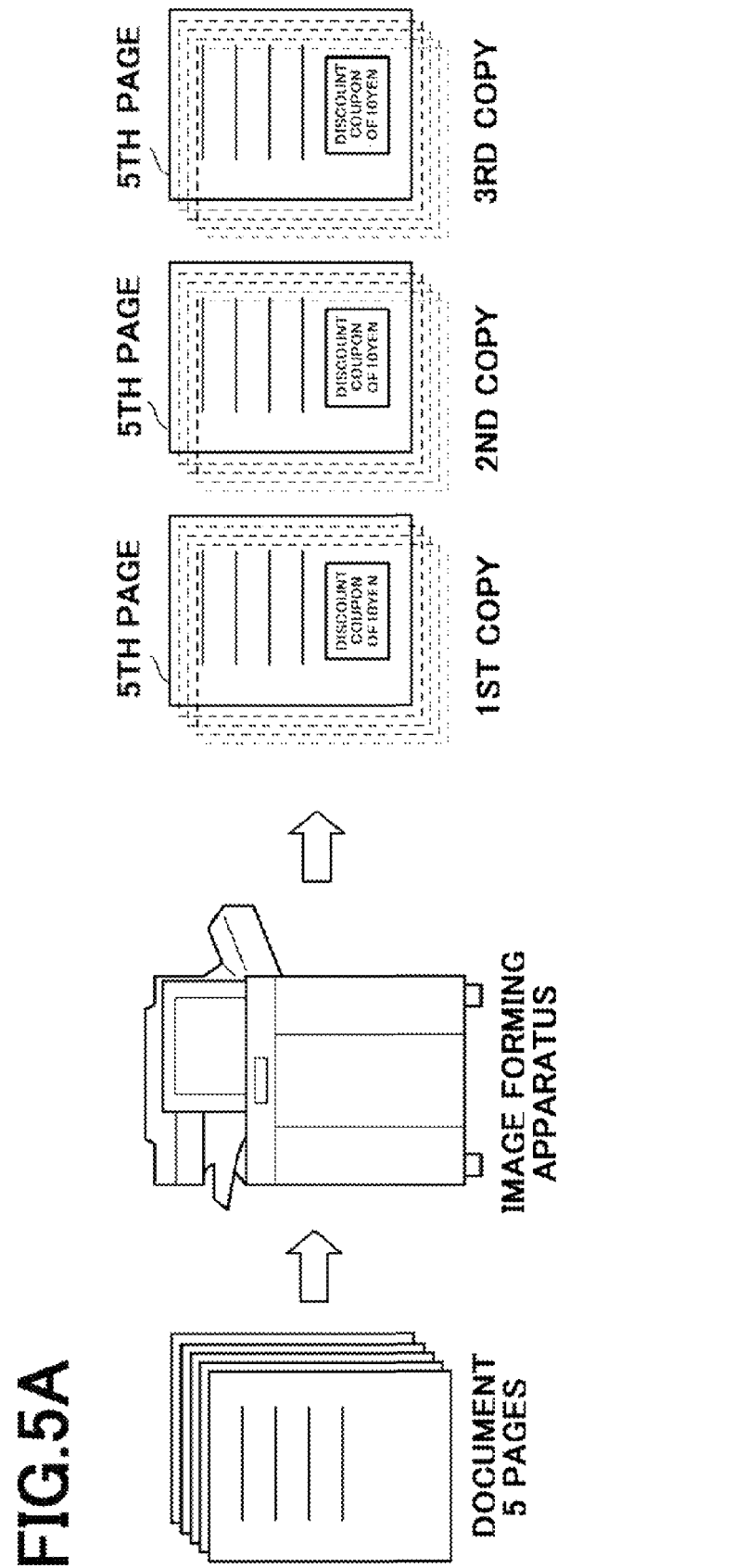

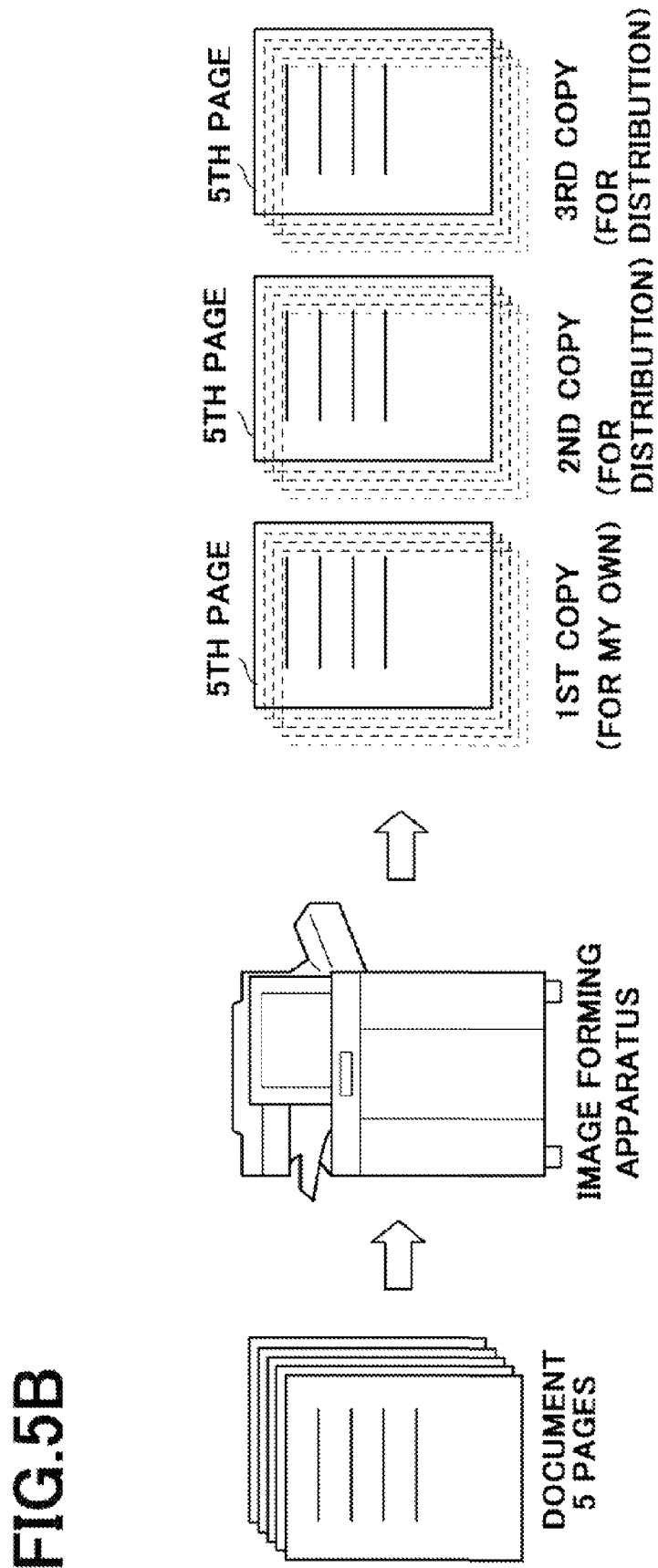

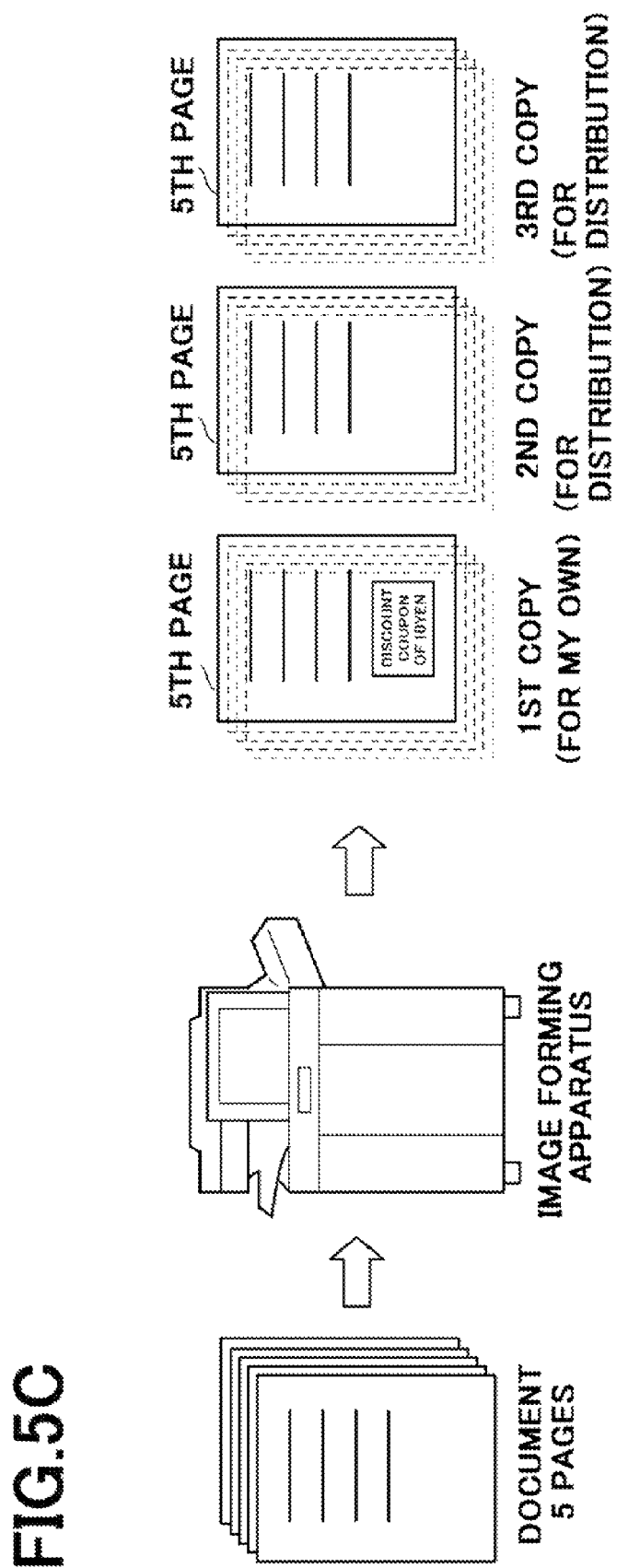

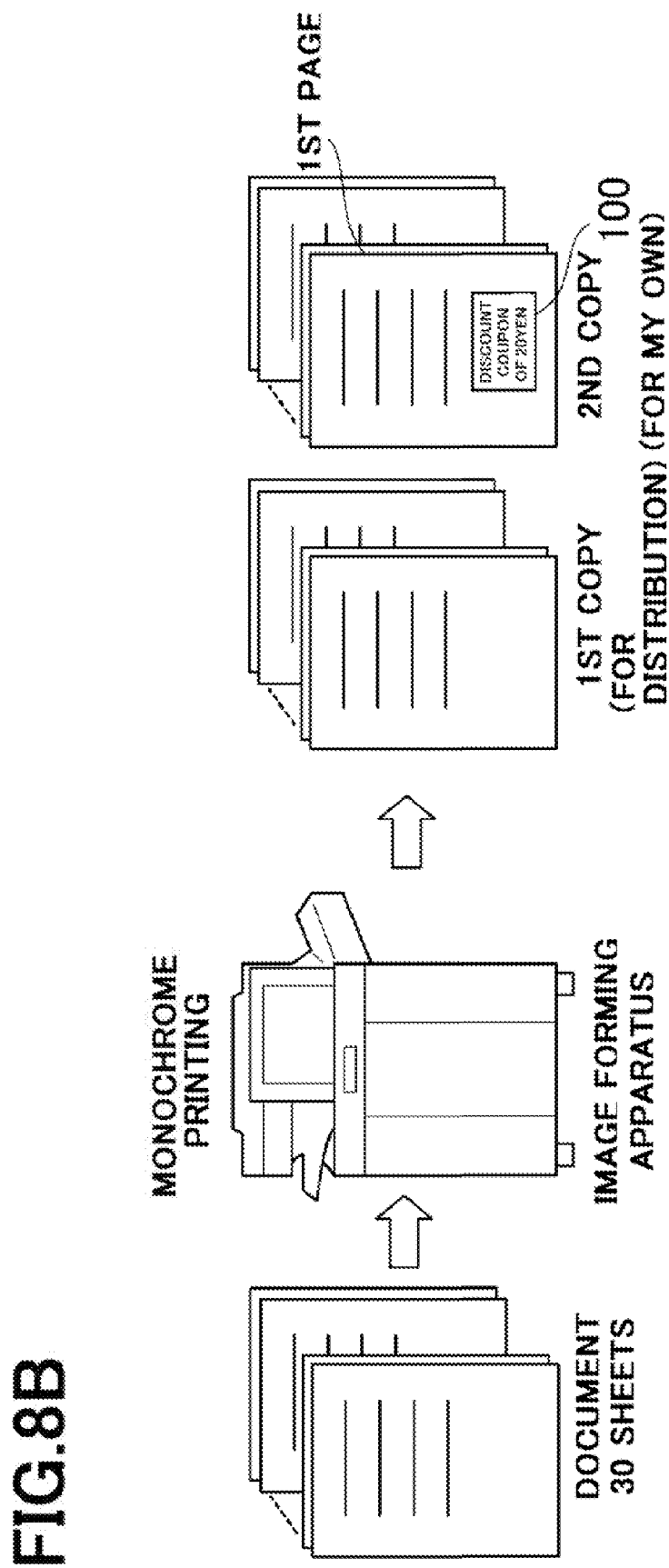

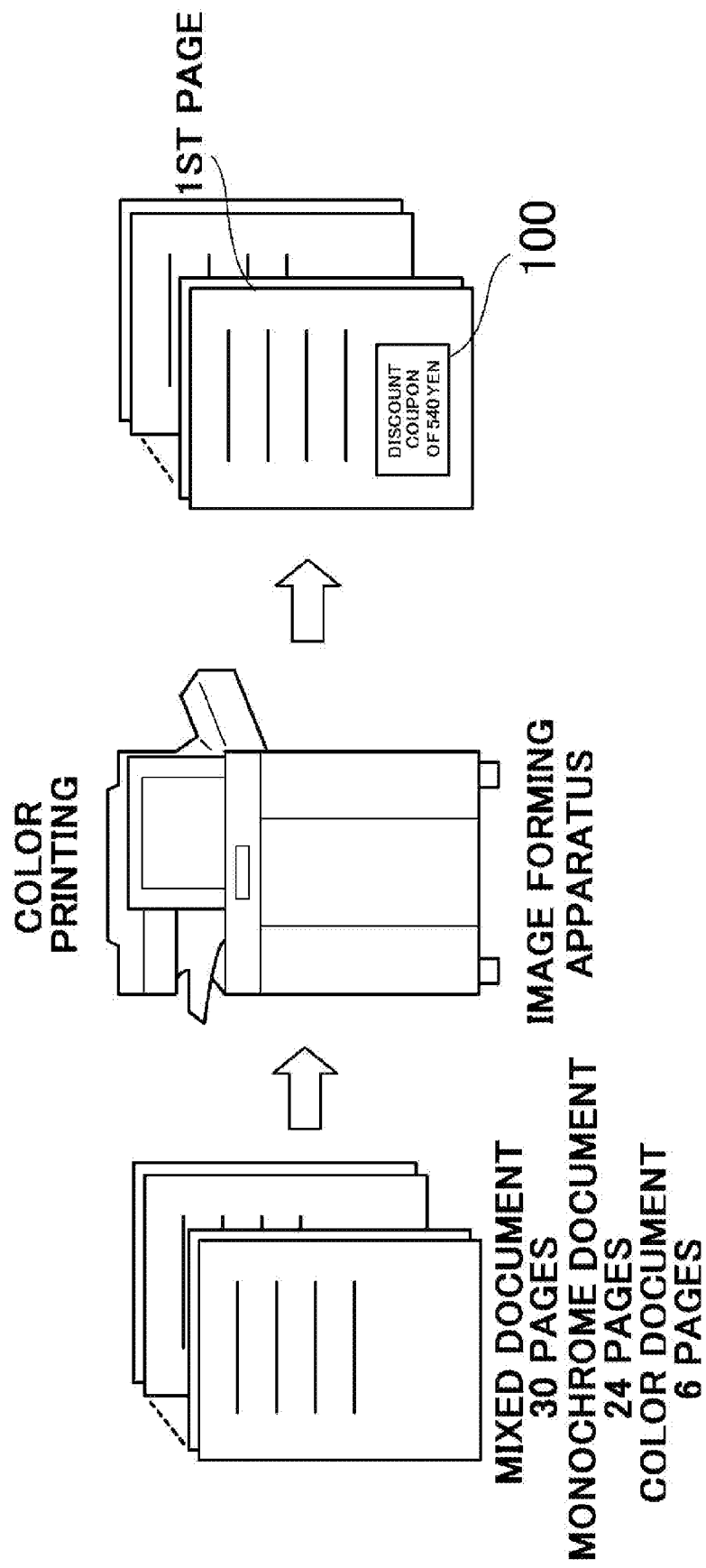

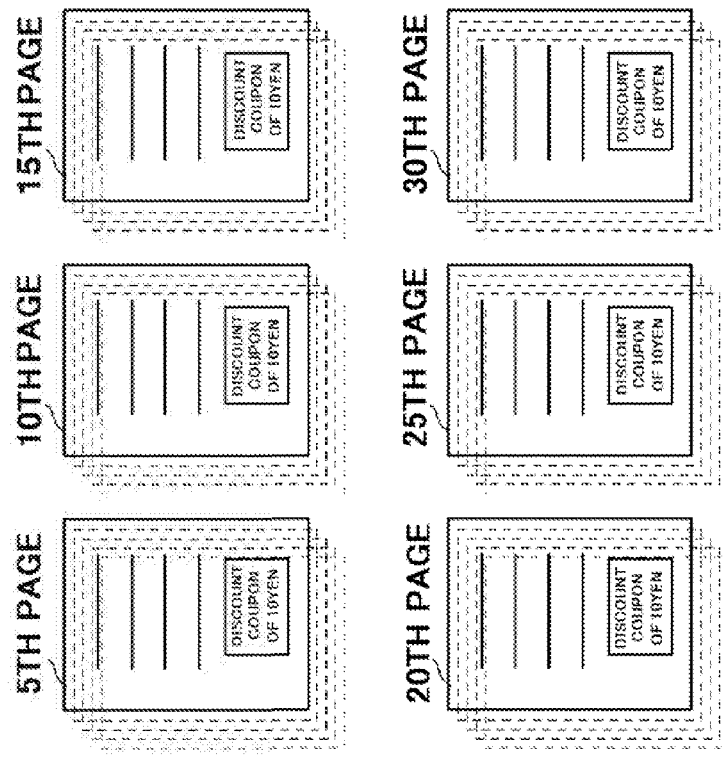
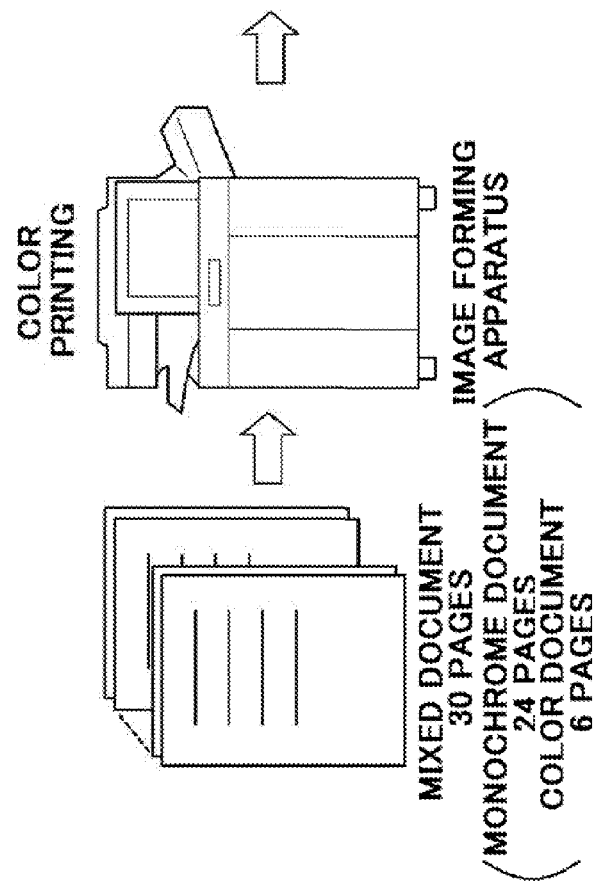
FIG.9B

IMAGE FORMING APPARATUS

INCORPORATION BY REFERENCE

This application is based on and claims the benefit of priority from Japanese Patent Application No. 2015-131512 filed on Jun. 30, 2015 and No. 2015-131514 filed on Jun. 30, 2015, the entire contents of that are hereby incorporated by reference.

BACKGROUND

The present disclosure relates to an image forming apparatus, such as a printer, a multifunction printer, a copying machine, a multifunction peripheral, which prints print data on a recording paper and outputs the recording paper to the outside.

The image forming apparatus, such as a printer, a multifunction printer, a copying machine, multifunction peripheral, installed in a convenience store or the like is available by paying a charge for utilization thereof by a user. It is common that the charge is paid for every time a sheet of paper is printed. A discount coupon available in the convenience store or the like is issued every the previously set number prints. It is customarily carried out as service for a user.

It is general that the discount coupon is printed in a separate sheet. However, the use of a technique disclosed in the typical technology allows printing of a recording paper using a margin area of the recording paper to be output. In the image forming apparatus of the typical technology, the apparatus identifies the margin area of image data to be printed and composes advertisement image data on the identified margin area.

If the discount coupon is printed on the margin area of the recording paper to be output and issued, as shown in FIG. 5A, the discount coupon is printed on the margin area of recording paper to be output every previously set number of prints. In FIG. 5A, a case is shown in which a document of 5 pages is copied and printed by 3 copies and the discount coupon having a discount amount of 10 yen is issued every 5 printing sheets. In this case, the discount is printed on a 5th page of each copy and issued to a user. However, since it can be a case where some user don't want to print the discount coupon on the recording paper, it needs for printing of the discount coupon on the margin area of the recording paper to set to be unavailable. Nonetheless, if printing of the discount coupon on the margin area is set to be unavailable, it is unable to make use of function of printing the discount coupon by using the margin area of recording paper, even if there exists a part (1st copy) on which the discount coupon can be printed using a margin area of the recording paper, as shown in FIG. 5B.

Further, as shown in FIG. 5C, a case where copy printing is performed, aside from the part (1st copy) on which a user wants to print, and parts (2nd and 3rd copies) on which the user don't want to print, a discount coupon is printed on a 5th page of a 1st copy. As a result, a discount coupon is not issued to the 2nd and 3nd copies, it becomes impossible for a user to be able to get benefits in accordance with the number of printing prints.

A charge is different depending on a copy type (monochrome or color), and a charge for color printing is set so as to be higher than that of monochrome printing. If a monochrome document and a color document are mixed, the copy type will be set to either of monochrome or color. However, if the copy type is set to color, the monochrome document is counted as color printing. This will result in paying a wasted charge. For that reason, a tendency becomes stronger that a user endures to degradation of printing quality and selects printing in which a copy type is set to monochrome. Thus, it was often the case that even if the image forming apparatus has a feature of color printing, the color printing is not used effectively.

FIG. 9 shows an example in which a discount coupon is printed on a margin area of a recording paper to be printed and issues it when a mixed document (30 pages) where a monochrome document (24 pages) and a color document (6 pages) are mixed are copy printed, a discount coupon is printed on a margin area of a recording paper to be output. Note that a charge for monochrome printing is 5 yen per page and a discount coupon having a discount amount of 10 yen is issued ever 30 printing sheets. Meanwhile, a charge for color printing is 30 yen per page and a discount coupon having a discount amount of 10 yen is issued per 5 printing sheets.

FIG. 9A is a printed matter in a case where the copy type is set to monochrome. In this case, the total charge amounts to 150 yen and a discount coupon of 10 yen is printed on a margin area of the 30th page. FIG. 9B is a printed matter in a case where the copy type is set to color. In this case, the total charge amounts to 900 yen and 600 yen (the difference of 25 yen between a monochrome document of 24 pages X color printing and monochrome printing) are wasted. In this way, a discount coupon of 10 yen (total 60 yen) is respectively printed on 5th, 10th, 15th, 20th, 25th, and 30th pages and due to this handling of the discount coupon becomes complicated.

SUMMARY

According to one aspect of the present disclosure, the image forming apparatus in which a discount amount is set every previously set number of printing sheets according one embodiment of the present disclosure comprises an operation part that receives an input of print copies; a document feeding part that sequentially feeds a mounted document one by one; a document reading part that reads the document fed by the document feeding part; a discount amount calculating part that calculates a total number of printing sheets by multiplying the printing sheets received by the operation part by the number of pages of the document after the total number of pages of the document is read out by the document reading part, and calculates a total discount amount based on the calculated total number of printing sheets; a coupon image generating part that generates a coupon image on which the total discount amount is written; a margin area detecting part that detects a margin area larger than the coupon image from among image data of the document read out by the document reading part, and identifies the detected margin area as a superimposing area; and a coupon image superimposing area that superimposes the coupon image on the superimposing area, wherein a discount coupon is issued by printing the image data of the document on which the coupon image is superimposed.

According to another aspect of the present disclosure, an image forming apparatus in which a charge for color printing is set to be larger than a charge for monochrome printing, and a discount amount is set every previously set number of printing sheets comprises an operation part that receives a setting input of a copy type of monochrome or color; a document feeding part that sequentially feeds a mounted document one by one; a document reading part that reads out the document fed by the document feeding part; an image data analyzing part that analyzes image data of the document read by the document reading part, and determines whether or not the image data is a monochrome document if the copy type is set to color; a coupon amount calculating part that calculates a total discount amount based on the total number of printing sheets obtained by multiplying the number of print copies received by the operation part by the number of pages of document, and calculates a total return amount by multiplying all or part of amount of the difference between a charge for color printing and a charge for monochrome printing by the number of pages of the monochrome document grasped by determination of the image data analyzing part, and calculates a total amount of the total number of printing sheets and the total return amount as a coupon amount after all page of the document is read out by the document reading part; a coupon image generating part that generates a coupon image on which the coupon amount is superimposed; a margin area detecting part that detects a margin area larger than the coupon image from among image data of the document read out by the document reading part, and identifies the detected margin area as a superimposing area; and a coupon image superimposing area that superimposes the coupon image on the superimposing area, wherein a discount coupon is issued by printing image data of the document on which the coupon image is superimposed.

BRIEF DESCRIPTION OF THE DRAWINGS

FIGS. 4A, 4B and 4C are views showing a print example of a discount coupon of an embodiment of an image forming apparatus according to a first embodiment of the present disclosure;

FIGS. 5A, 5B and 5C are views showing a print example of a discount coupon in a typical technology;

FIGS. 8A, 8B and 8C are views showing a print example of a discount coupon of an embodiment of an image forming apparatus according to a second embodiment of the present disclosure; and FIGS. 9A and 9B are views showing a print example of a discount coupon of a typical technology.

DETAILED DESCRIPTION (First Embodiment)

Figure 1:
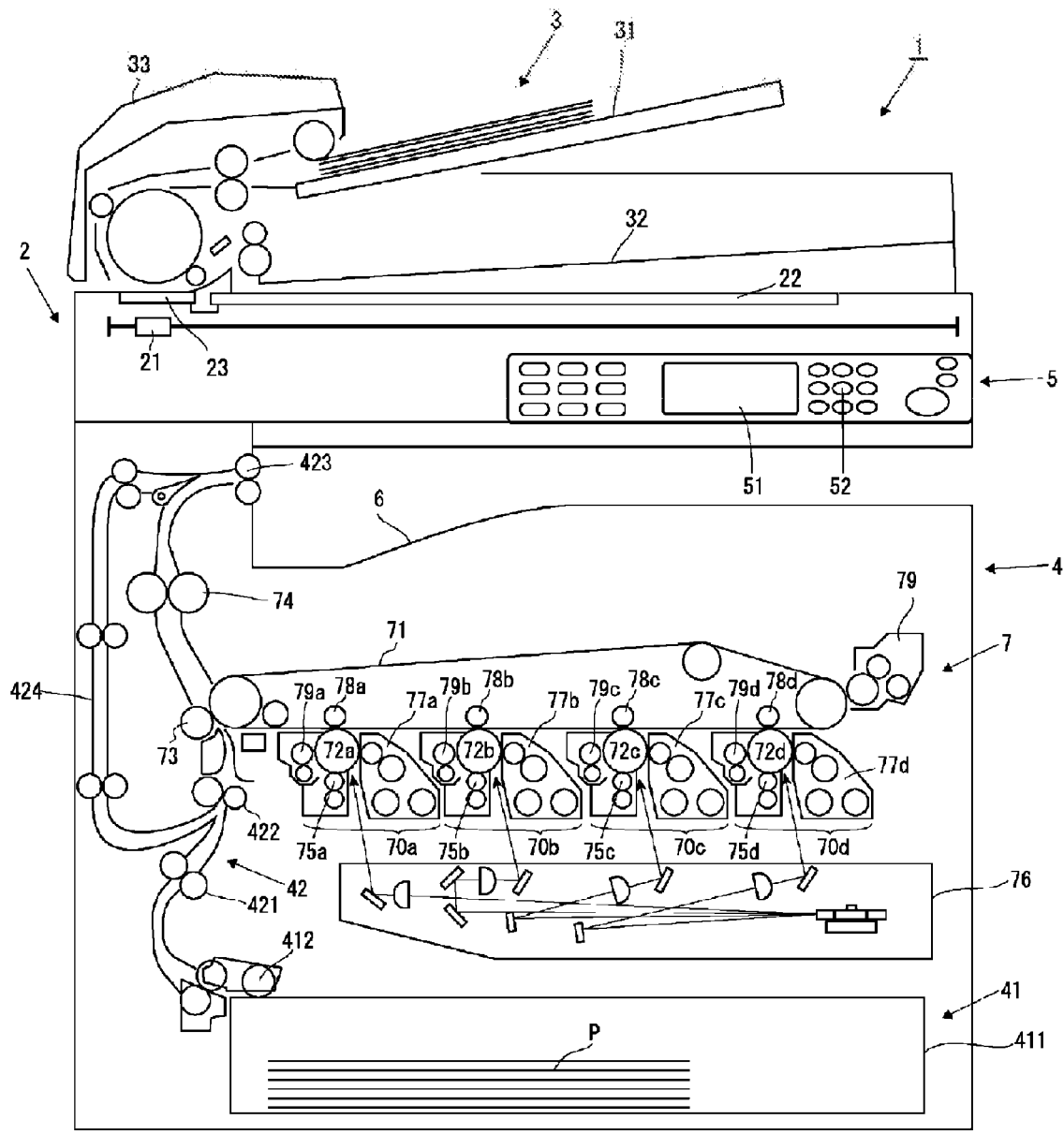
FIG. 1 is a schematic cross sectional view showing an internal configuration of an embodiment of an image forming apparatus according to a first embodiment of the present disclosure.

A first embodiment of the present disclosure will be specifically described with reference to the accompanying drawings.

Herein, similar components are designated with the same reference numerals.

An image forming apparatus according the first embodiment is a MFP (Multifunction Peripheral) and a copying machine. Referring to FIG. 1, the image forming apparatus 1 according to the first embodiment includes a document reading part 2, a document feeding part 3, a main body 4, and an operation part 5. The document reading part 2 is arranged at an upper part of the main body 4. The document feeding part 3 is arranged on an upper part of the document reading part 2. The operation part 5 composed of a start key, a ten key and a LCD or the like is arranged at a near side of the image forming apparatus 1.

There is provided in the operation part 5 a liquid crystal display part 51 and an operation key 52. A user operates the operation part 5 and inputs the number of printing sheets to cause the image forming apparatus 1 to perform a printing operation. The liquid crystal display part 51 displays a state of the image forming apparatus, displays an image formation state, and the number of printing sheets and can perform various operations as a touch panel. Additionally, there is provided, in the operation part 5, as an operation key 52, a start key by which a user instructs the image forming apparatus 1 to start an image formation, and a stop/clear button to be used in stopping image formation.

The document reading part 2 includes a scanner 21, a platen glass 22, and a document reading slit 23. The scanner 21 is composed of a LED and a CCD (Charge Coupled Device) sensor or the like, and movably arranged in a conveying direction of a document of the document feeding part 3. The platen glass 22 is a document stand made of a transparent material such as glass. The document reading slit 23 has a gap formed in an orthogonal direction to the conveying direction of the document by the document feeding part 3.

When reading a document mounted on the platen glass 22, the scanner 21 is moved first to a position opposing the platen glass 22. The scanner 21 reads the document while scanning the document mounted on the platen glass 22 and acquires image data of the document. Then, the scanner 21 outputs to the main body 4 as print data for printing the image data of the document on a recording paper P. Further, when reading a document conveyed by the document feeding part 3, the scanner 21 is moved to a position opposing the document reading slit 23. Then, the scanner 21 reads the document in synchronization with a conveying operation of the document by the document feeding part 3 and acquires the image data of the document. After that, the scanner 21 outputs the image data of the document to the main part 4 as print data to be printed on the recording paper P. Note that if a copy type is set to monochrome, the document reading part 2 reads the document as monochrome (binary and gray scale) image data. Further, if the copy type is set to color, the document reading part 2 reads the document as color (RGB) image data.

The document feeding part 3 includes a document mounting part 31, a document discharging part 32, and a document conveying mechanism 33. A document mounted on the document mounting part 31 is sequentially fed by the document conveying mechanism 33 one by one by to a position opposing the document reading slit 23. After that, the document is discharged into the document discharging part 32. Note that the document feeding part 3 is configured to be a folding type, and to be able to open an upper surface of the platen glass 22 by lifting upwardly the document feeding part 3.

The main body 4 includes a recording part 7 that applies printing on the recording paper P, a recording paper feeding part 41, and a document conveying part 42. The recording paper feeding part 41 includes a plurality of feeding cassettes 411 that stores the recording paper P and a feeding roller that feeds one by one the recording paper P from the feeding cassettes 411 to the recording paper conveying part 42. The recording paper conveying part 42 includes a conveying roller 421 that supplies the recording paper P fed from the recording paper feeding part 41 to the recording part 7, a resist roller 422 that controls a supply timing of the recording paper P to the recording part 7, a discharging roller 423 that discharges the recording paper P on which a recording is applied by the recording part 7 into an in-body tray 6, and a paper inversion conveying path 424 that performs duplex printing. When performing the duplex printing, printing is applied first by the recording part 7 on one side of the recording paper P fed from the recording paper feeding part 41. Next, the recording paper P is conveyed to a position of the discharging roller 42. Then, the recording paper P is conveyed to a position of the conveying roller 423. After that, the discharging roller 423 is reversely rotated before the recording paper P is discharged into the in-body tray 6, and the recording paper P is conveyed to the paper inversion conveying path 424. The recording paper P conveyed to the paper inversion conveying path 424 is conveyed again to the recording part 7 while inversing its two sides. In the recording part 7, printing is performed on a surface opposite to the previously printed surface. In this way, the recording paper P on which duplex printing is applied is discharged into the in-body tray 6.

In the recording part 7, there are arranged four image forming parts 70a, 70b, 70c and 70d correspondingly to an image of four different colors (yellow, cyan, magenta and black). Further, an intermediate transfer belt 71 is provided adjacent to the four image forming parts 70a, 70b, 70c and 70d. In the four image forming parts 70a, 70b, 70c and 70d, there are respectively arranged photosensitive drums 72a, 72b, 72c and 72d, each of which carries a visible image (toner image) of each color. The toner image formed on the photosensitive drums 72a, 72b, 72c and 72d is sequentially transferred on the immediate transfer belt 71 which moves while abutting against the photosensitive drums 72a, 72b, 72c and 72d. The toner image sequentially transferred on the immediate transfer belt 71 is transferred at once on the recording paper P supplied from the recording paper feeding part 41 in a second transfer roller 73. The toner image transferred on the recording paper P is fixed on the recording paper P in a fixing apparatus 74.

Around the four photosensitive drums 72a, 72b, 72c and 72d, each being rotatably arranged at the four image forming parts 70a, 70b, 70c and 70d, there are provided photosensitive drums, rollers and devices as follows. Charging devices 75a, 75b, 75c and 75d that charge each of the photosensitive drums 72a, 72b, 72c and 72d. An exposure unit 76 that exposes photosensitive drums 72a, 72b, 72c and 72d form an electrostatic latent image. Developing devices 77a, 77b, 77c and 77d that form a toner image on each of the photosensitive drums 72a, 72b, 72c and 72d. Primary transfer rollers 78a, 78b, 78c and 78d that transfer each of the toner images formed on the photosensitive drums 72a, 72b, 72c and 72d to an intermediate transfer belt 71. Cleaning devices 79a, 79b, 79c and 79d that remove developing powder remained on the photosensitive drums 72a, 72b, 72c and 72d.

First of all, an image forming operation uniformly charges a surface of the photosensitive drums 72a, 72b, 72c and 72d by the charging devices 75a, 75b, 75c and 75d. Next, the exposure unit 76 irradiates light on the surface of the photosensitive drums 72a, 72b, 72c and 72d in accordance with print data. Thereby, an electrostatic latent image is formed on the photosensitive drums 72a, 72b, 72c and 72d in accordance with the print data. The developing devices 77a, 77b, 77c and 77d include a developing roller oppositely arranged at the photosensitive drums 72a, 72b, 72c and 72d. These photosensitive drums supply a toner of yellow, cyan, magenta and black on the photosensitive drums 72a, 72b, 72c and 72d by the developing roller and electrostatically sticks an electrostatic latent image thereon. Thereby, a toner image is formed in accordance with the electrostatic latent image. Next, a predetermined transfer voltage is applied to the primary transfer rollers 78a, 78b, 78c and 78d. As a result, each of the toner images of yellow, cyan, magenta and black on the photosensitive drums 72a, 72b, 72c and 72d is primarily transferred on the immediate transfer belt 71 at a predetermined timing, and a full color toner image is formed on the immediate transfer belt 71. After that, toners remained on a surface of the photosensitive drums 72a, 72b, 72c and 72d are removed by the cleaning devices 79a, 79b, 79c and 79d, in preparation for formation of a new electrostatic latent image being subsequently continuously performed.

A sheet made of a dielectric resin is used for the intermediate transfer belt 71. As a candidate of the intermediate transfer belt 71, a belt whose both ends are piled up and joined into an endless form, and a seamless belt are used. The intermediate transfer belt 71 brings a toner image which is formed at a timing at which the recording paper P is conveyed to a nip part between the secondary transfer roller 73 and the intermediate transfer belt 71, to the nip part of the secondary transfer roller 73. Thereby, a full color image is secondary transferred on the recording paper P. Note that the intermediate transfer belt 71 and the secondary transfer roller 73 are rotary driven at the same linear velocity as that of the photosensitive drums 72a, 72b, 72c and 72d. Further, at an upstream side of a moving direction of the intermediate transfer belt 71 seen from the image forming parts 70a, 70b, 70c and 70d, there is arranged a cleaning device 79 to remove the toners remained on a surface of the intermediate transfer belt 71.

Figure 2:
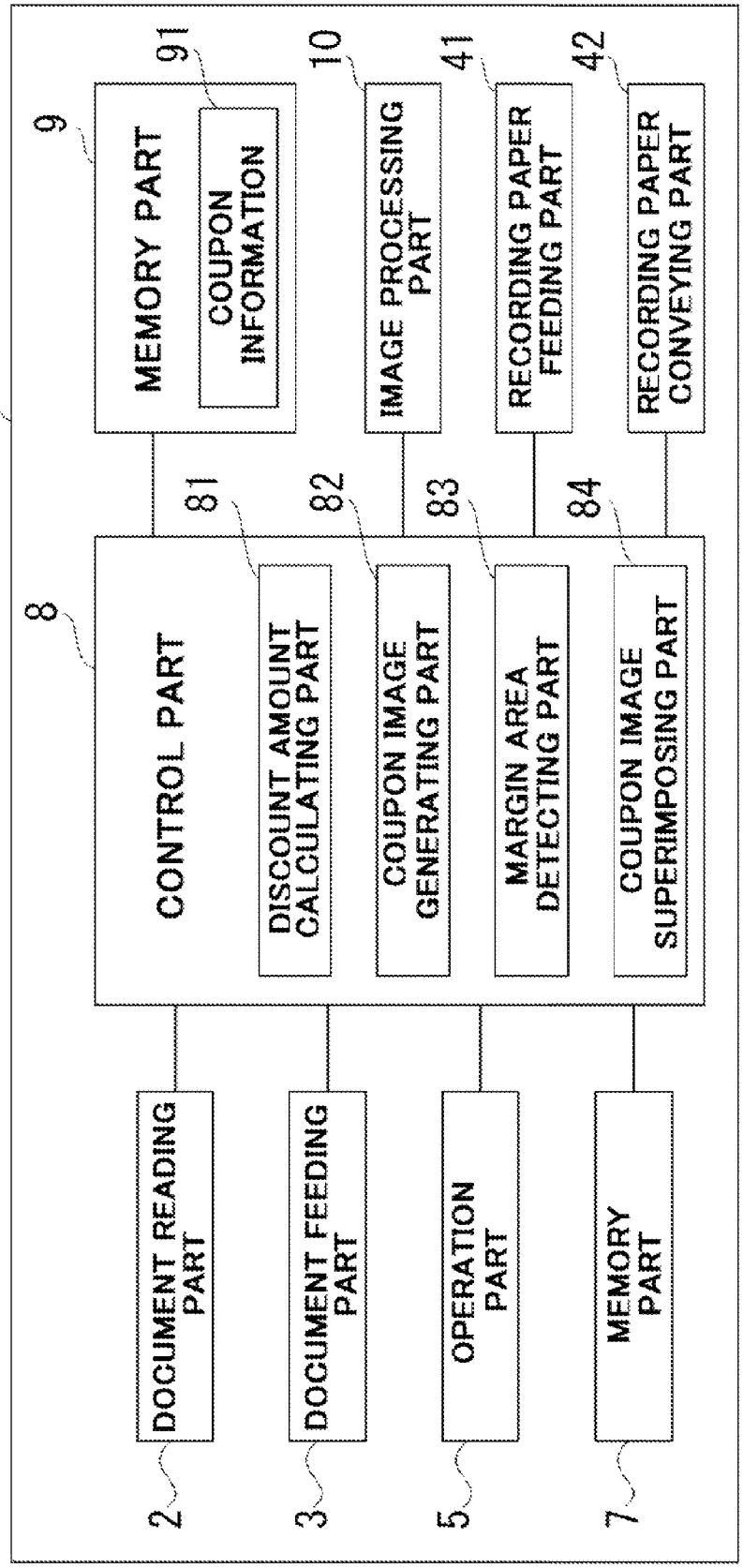
FIG. 2 is a block diagram showing a schematic configuration of an image forming apparatus according to a first embodiment of the present disclosure.
Figure 3:
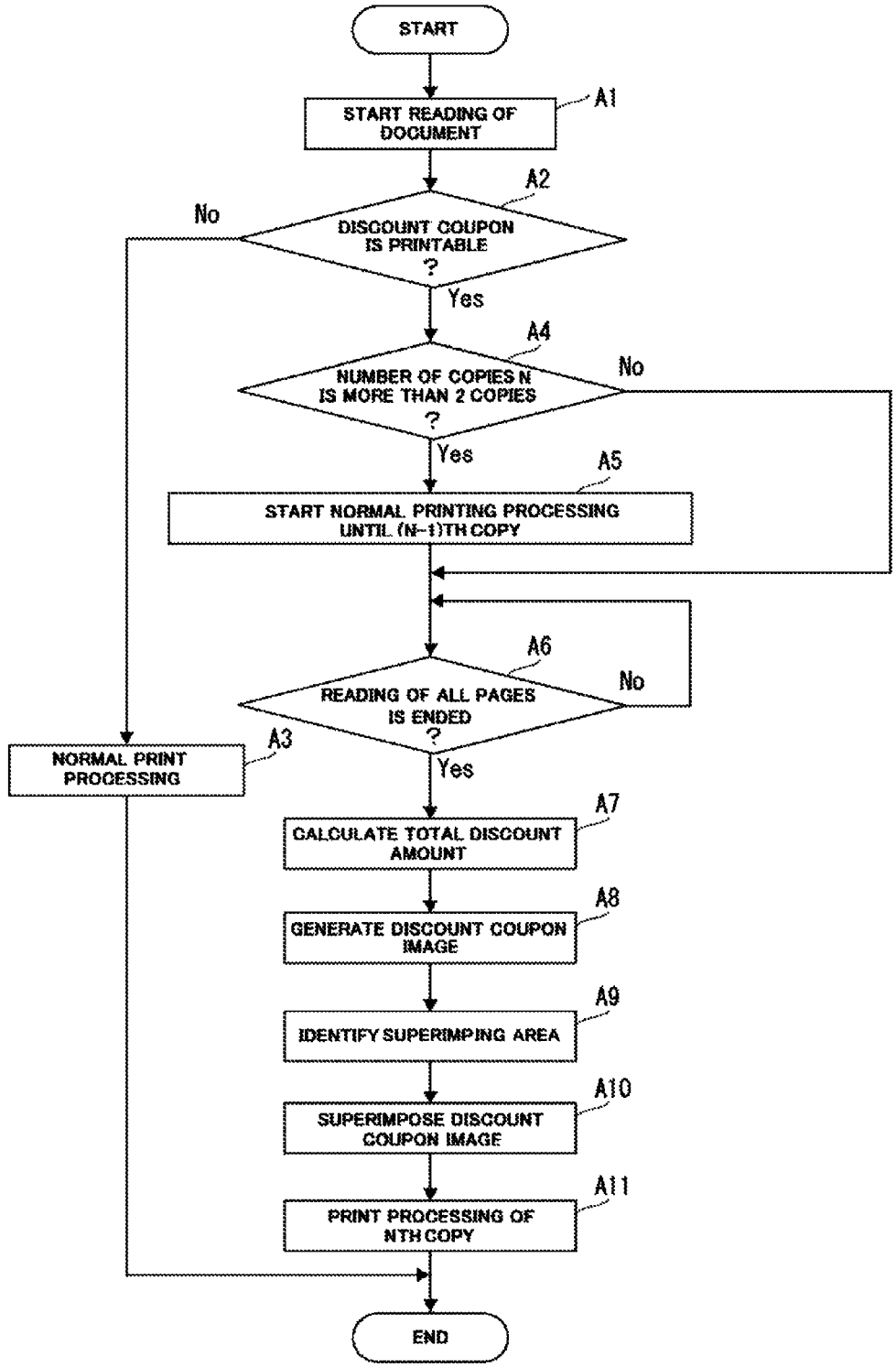
FIG. 3 is a flowchart explaining a discount coupon printing operation in an embodiment of an image forming apparatus according to a first embodiment of the present disclosure.

FIG. 2 is a block diagram showing a schematic configuration of the image forming apparatus 1. The above-mentioned document reading part 2, the document feeding part 3, the operation part 5, the recording part 7, the recording paper feeding part 41 and the recording paper conveying part 42 are connected to the control part 8 where an operation thereof is controlled thereby. Also, a memory part 9 and an image processing part 10 are connected to the control part 8.

The memory part 9 is memory means, such as a semiconductor memory and a HDD (Hard Disk Drive), and stores image data of a document as print data acquired by reading the document by the document reading part 2. Further, the memory part 9 stores coupon information 91 in which a discount amount calculated in accordance with the number of printing sheets is set. Note that a discount amount of 10 yen is set to the coupon information 91 according to the first embodiment every 5 printing sheets.

The image processing part 10 is means for performing prescribed image processing to the image data of the document acquired by reading the document by the document reading part 2. Examples of image processing includes, for example, scaling processing, and image improvement processing such as density adjustment and gradation adjustment.

The control part 8 is an information processing part such as a microcomputer including a CPU (Central processing Unit), a ROM (Read Only Memory) and a RAM (Random Access Memory). The ROM stores a control program to perform an operation control of the image forming apparatus 1. The control part 8 reads the control program stored in the ROM and develops the control program on the RAM. Thereby, an overall control of the apparatus is achieved in response to prescribed instruction information input by the operation part 5. Here, the control part 8 functions as a discount amount calculating part 81, a coupon image generating part 82, a margin area detecting part 83 and a coupon image superimposing part 84.

The discount amount calculating part 81 calculates a total number of printing sheets by multiplying the number of printing sheets input by the operation part 5 by the number of pages. A total discount amount is calculated based on the calculated total number of printing sheets and the coupon information 91.

The margin area detecting part 83 detects a margin area larger than a coupon image generated by the coupon image generating part 82 from among the image data of the document read by the document reading part 2.

The coupon image generating part 82 generates the coupon image on which the total discount amount calculated by the discount amount calculating part 81 is written.

Then, the detected margin area is identified as a superimposing area in which the coupon image is superimposed. The margin area detecting part 83 continues to detect a margin area from a 1st page toward the last page of the document in the order of a front surface and a back surface, and identifies an initially detected margin area as a superimposing area.

The coupon image superimposing part 84 superimposes the coupon image generated by the coupon image generating part 82 on the superimposing area identified by the margin area detecting part 83.

Next, a detailed description will be made to a discount coupon printing operation by the image forming apparatus 1 according to the first embodiment with reference to FIGS. 2 to 4A, 4B and 4C.

A user performs an input of the number of copies N from the liquid crystal display of the operation part 5 and sets printable/unprintable of a discount coupon after a document is mounted on the document mounting part 31 of the document feeding part 3. Then, the user operates an operation key 52 (start key) of the operation part 5 to instruct the image forming apparatus 1 to start copy printing (image formation).

When the operation part 8 of the image forming apparatus 1 receives a starting instruction of the copy printing, the operation part 8 controls the document feeding part 3 and the document reading part 2 to start reading of the document (step A1). Next, the control part 8 determines whether or not printable and unprintable of the discount coupon (step A2). If the discount coupon is unprintable in step A2, the control part performs normal printing processing without performing printing of the discount coupon (step A3). After that, the printing operation of the discount coupon is ended.

Otherwise, if the discount coupon is printable in step A2, the control part 8 determines whether or not the set number of copies N is more than 2 copies (step A4). If the set number of printing sheets is determined to more than 2 copies in step A4, the control part 8 starts normal printing processing until (number of copies N−1) th copy (step S5), and waits for an end of reading of all pages of the document (step A6). Otherwise, if the number of copies N is less than 2, that is 1, in step A4, processing of the control part 8 directly proceeds to step A6.

If reading of all pages of the document is ended in step A6, the discount amount calculating part 81 calculates a total number of printing sheets by multiplying the number of copies N by the number of pages of the read document. Then, a total discount amount is calculated based on the calculated total number of printing sheets and the coupon information 91 (step A7). In the present embodiment, a discount amount of 10 yen is set every 5 printing sheets as the coupon information 91. Therefore, if the total number of printing sheets is 15, the total discount amount to be calculated amounts to 30 yen.

Next, the coupon image generating part 82 generates a coupon image on which the total discount amount calculated by the discount amount calculating part 81 is superimposed (step A8).

Next, the margin area detecting part 83 detects a margin area larger than the coupon image generated by the coupon image generating part 82 from among the image data of the document read by the document reading part 2, and identifies the coupon image as a superimposing area on which the coupon image is superimposed (step A9).

Then, the coupon image generating part 84 superimposes the coupon image generated by the coupon image generating part 82 on the superimposing area identified by the margin area detecting part 83 (step A10). Note that processing in steps A6 to A10 can be performed in parallel with the normal printing processing until the (number of copies N−1)th copy in step S5. Accordingly, if the number of copies N is plural, a printing operation is started without waiting for reading of all pages of the document.

Next, the control part 8 performs printing processing of the last Nth copy using the image data on which the coupon image is superimposed by the coupon image superimposing part 84 (step A11). After that, a discount coupon printing operation is ended.

FIG. 4A shows a print example of a discount coupon in a case where the number of pages is 15 pages, the number of copies N=1, and a margin area in a surface of page 1, is identified as a superimposing area. In this case, a discount amount is summed up and the summed up discount coupon 100 on which 30 yen that is a total discount amount is printed on a surface of page 1. Therefore, a user can easily grasp the presence of the discount coupon 100 without looking for a printed recording paper. This enhances convenience of the user.

FIG. 4B shows a print example of a discount coupon in a case where the number of pages is 5 pages, the number of copies N=1, and a margin area in a surface of page 1, is identified as a superimposed area. In this case, a discount amount is superimposed and a summed up discount coupon 100 on which 30 yen that is a total discount amount is printed on a surface of page 1 of 3th copy. For this reason, when printing a plurality of copies, it is possible for a user to receive benefits in accordance with the number of printing sheets, even if there is a copy on which the user don't want to print the discount coupon.

As shown in FIG. 4C, if there is no margin area serving as a superimposing area on the surface of page 1 of the document, a margin area of a back surface of 1 page and page 2 and after is identified as a superimposing area. In this case, the coupon image generating part 82 generates a guidance notification image which is smaller than the coupon image and indicates a position (page and surface) of the identified superimposing area. Then, the coupon image superimposing part 84 superimposes a guidance notification image generated by the coupon image generating part 82 on the image data on a surface of page 1. Thereby, a guidance notation 110 that notifies a position (page and surface) where the discount coupon 100 is printed on a surface of page 1 of the last Nth copy. A user can easily grasp the presence and the printed position of the discount coupon 100 owing to the guidance notation 110.

As described in the above, according to the first embodiment, the first embodiment provides the image forming apparatus 1 in which the discount amount is set every previously set number of printing sheets.

The image forming apparatus 1 according to the first embodiment includes the operation part 5 that receives an input of the number of printing sheets, the document feeding part 3 that sequentially feeds a mounted document one by one, the document reading part 2 that reads the document fed by the document feeding part 3, the discount amount calculating part that calculates a total number of printing sheets by multiplying the number of copies received by the operation part 5 by the number of pages and calculates a total discount amount based on the calculated total number of printing sheets, the coupon image generating part 82 that generates a coupon image on which the total discount amount is superimposed, the margin area detecting part 83 that detects a margin area larger than the coupon image from among the image data of the document read by the document reading part 2 and identifies the detected margin area as a superimposing area, and the coupon image superimposing part 84 that superimposes the coupon image on the superimposing area.

With this configuration, the image forming apparatus 1 according to the present embodiment issues a discount coupon by printing the image data of the document on which the coupon image is superimposed.

Further, with this configuration, a user can receive benefits in accordance with the printing sheets even if there is a copy on which the user don't want to print the discount coupon in printing a plurality of copies. Furthermore, since the discount amount is superimposed on the discount coupon 100, the user can easily grasp the presence of the discount coupon 100 without searching for a printed recording paper. This enhances convenience of the user.

(Second Embodiment)

Next, a description will specifically be made to a second embodiment of the present disclosure with reference to the drawings.

Figure 6:
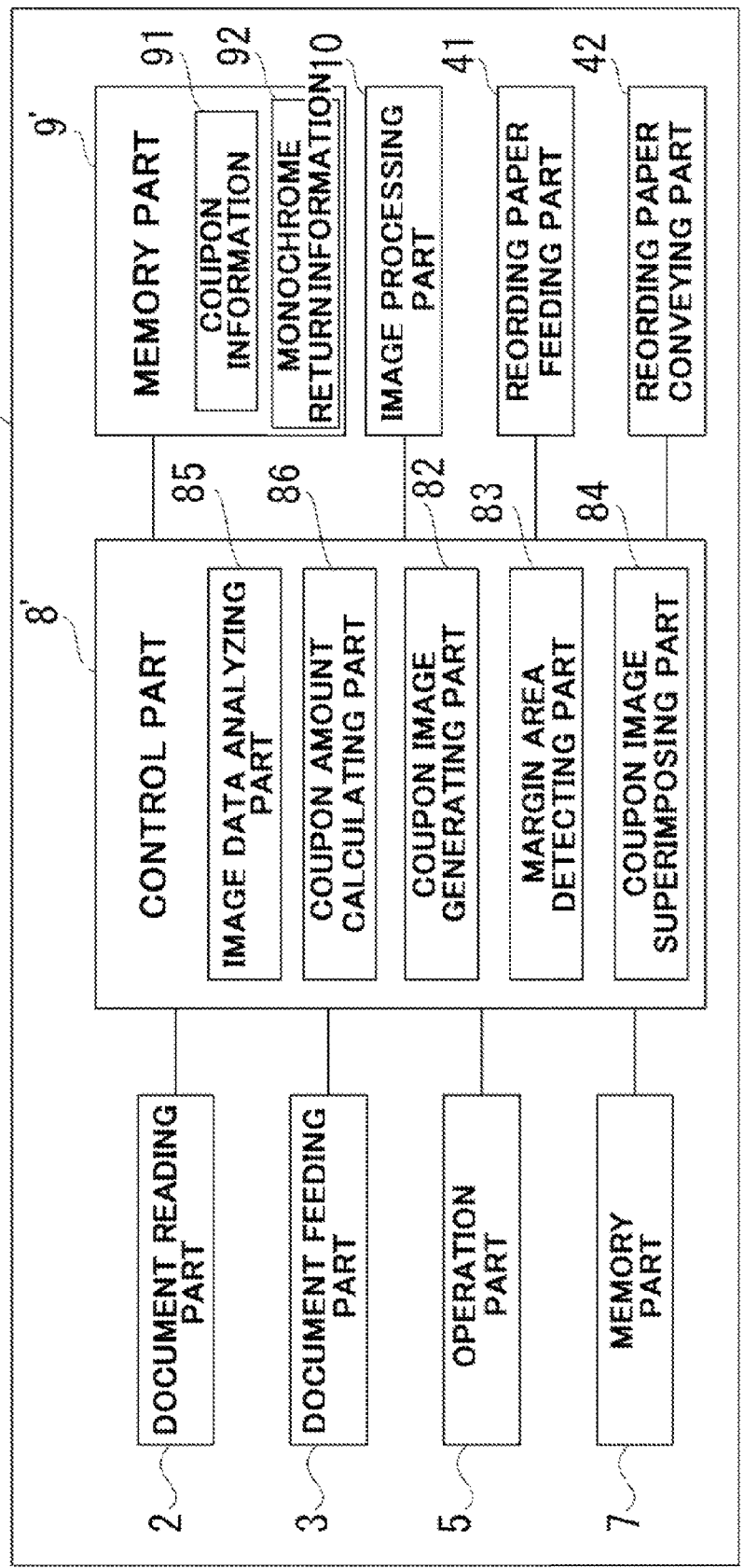
FIG. 6 is a block diagram showing a schematic configuration of an image forming apparatus according to a second embodiment of the present disclosure.
Figure 7:
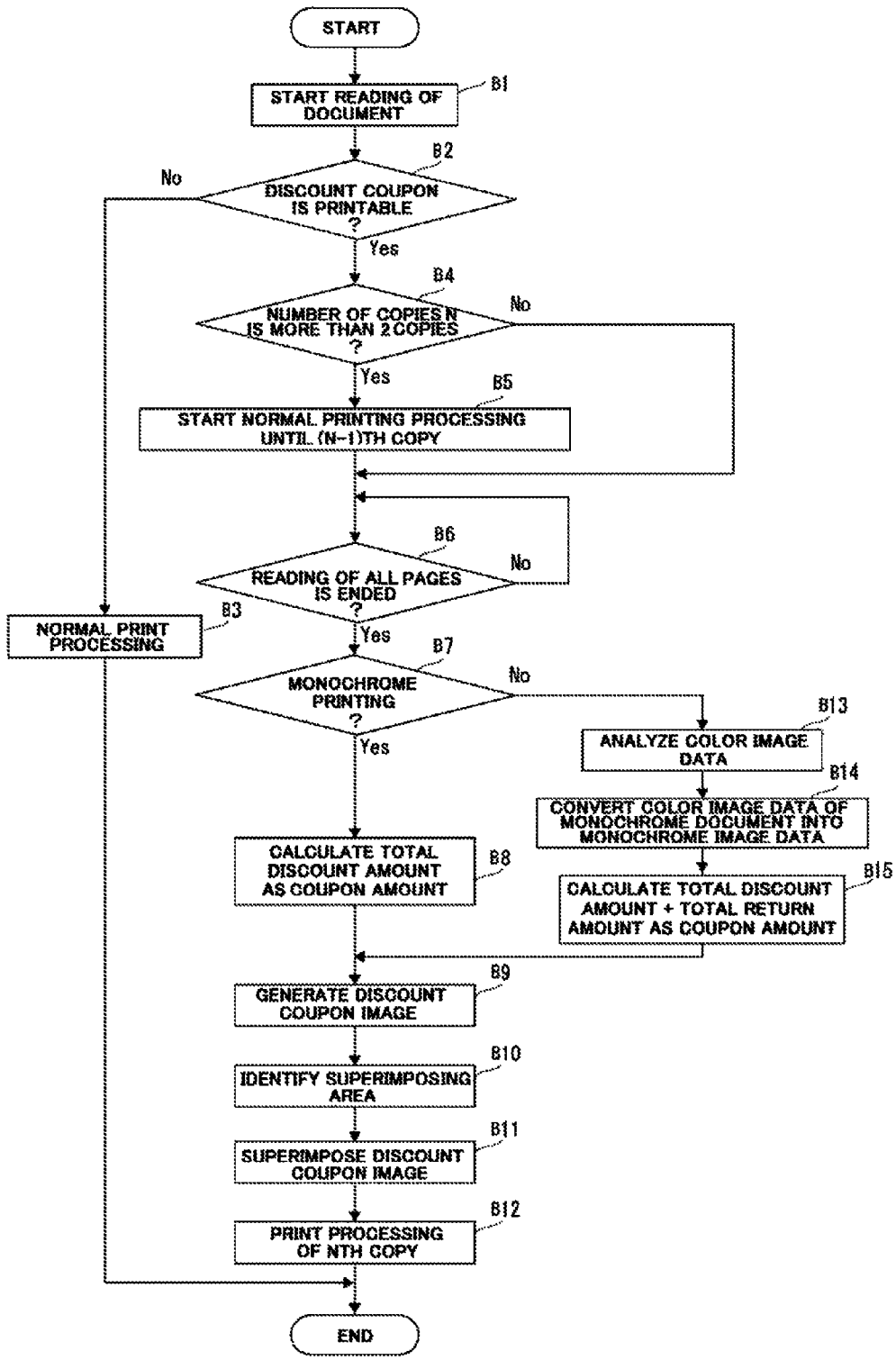
FIG. 7 is a flowchart explaining a printing operation of a discount coupon of an embodiment of an image forming apparatus according to a second embodiment of the present disclosure.

FIG. 6 is a block diagram showing a schematic configuration of the image forming apparatus 1.

In FIG. 6, similar components are designated with the same reference numerals, and description thereof is omitted for brevity's sake.

A memory 9' stores coupon information 91 in which each of discount amounts is set occurring in accordance with the number of printing sheets of monochrome printing and color printing, and monochrome return information 92. Here, in the coupon information 91 according to the second embodiment, a discount amount of 10 yen is set, every 30 printing sheets as against monochrome printing whose charge is 5 yen per 1 sheet, and a discount amount of 10 yen is set, every 5 printing sheets as against color printing whose charge is 30 yen per 1 sheet. Moreover, the monochrome return information 92 is for reducing a user all or part of the difference between the color printing and the monochrome printing when a copy type is color and copy printing of a monochrome document is performed. In the second embodiment, the monochrome return is set to 200 yen that is part the difference of 250 yen between the color printing and the monochrome printing.

An image data analyzing part 85 whose copy type is set to color type respectively analyzes color image data of all pages of the document read by the document reading part 2. Then, the image data analyzing part 85 determines whether the read document is either of the monochrome document or the color document, and notifies the number of pages of the monochrome document to the coupon amount calculating part 86. After that, the image data analyzing part 85 converts the color image data that is the monochrome document into monochrome (binary or gray scale) by the image processing part 10.

When the copy type is set to monochrome, the coupon amount calculating part 86 calculates a total number of printing sheets by multiplying the number of copies input by the operation part 5 by the number of pages. At the same time, the coupon amount calculating part 86 calculates a total discount amount based on the calculated total number of printing sheets and the coupon information 91. After that, the coupon amount calculating part 86 outputs the calculated total discount amount as a coupon amount to the coupon image generating part 82. Further, when the copy type is set to color, the coupon amount calculating part 86 calculates a total discount amount based on the total number of printing sheets and the coupon information 91. At the same time, the coupon amount calculating part 86 calculates a total return amount based on the number of pages of the monochrome document and the monochrome return information 92 notified from the image data analyzing part 85. After that, the coupon amount calculating part 86 outputs a total amount obtained by adding the total discount amount and the total return amount as a coupon amount to the coupon image generating part 82.

Next, a description will specifically be made to a discount coupon printing operation by the image forming apparatus 1 according to the second embodiment with reference to FIGS. 6 to 8A, 8B and 8C.

A user performs an input of the number of copies N by the liquid crystal display part 51 of the operation part 5 and setting of printable/unprintable of a discount coupon after a document is mounted on the document mounting part 31 of the document feeding part 3. Then, the user operates an operation key 52 (start key) of the operation part 5 to instruct the image forming apparatus 1 to start copy printing (image formation).

When a control part 8' of an image forming apparatus 1' receives a start instruction of copy printing, the control part 8' controls the document feeding part 3 and the document reading part 2 to start reading of the document (step B1). Then, the control part 8' determines whether a discount coupon is printable or unprintable (step B2). If a copy type is set to monochrome in step B1, the document reading part 2 reads the document as monochrome (binary or gray scale) image data. Further, if the copy type is set to color in step B1, the document reading part 2 reads the document as color (RGB) image data. If the discount coupon is unprintable in step B2, the control part 8' performs normal printing processing without performing printing of the discount coupon (step B3). After that, the discount coupon printing operation is ended.

Otherwise, if the discount coupon is printable in step B2, the control part 8' determines whether or not the set number of copies N is more than 2 copies (step B4). If the number of copies is more than 2 copies in step B4, the control part 8' stars normal printing processing until (number of copies N−1)th copy (step B5), and waits for completion of reading of all pages of the document (step B6). Otherwise, if the number of copies N is less than 2 copies, that is 1 copy, in step B4, processing of the control part 8' directly proceeds to step B6.

If reading of all pages of the document is ended in step B6, the control part 8' determines whether or not a copy type is set to monochrome, that is, monochrome printing (step B7). If the copy type is monochrome printing in step B7, the coupon image calculating part 86 calculates a total number of printing sheets by multiplying the number of copies N by the number of pages of the read document. At the same time, the coupon image calculating part 86 calculates a total discount amount as a coupon amount based on the calculated total number of printing sheets and the coupon information 91 (step B8). In the second embodiment, a discount amount of 10 yen is set every 30 prints sheets as the coupon information 91 of the monochrome printing. Thus, if the total number of printing sheets is 60 sheets, a total discount amount to be calculated amounts to 20 yen.

Next, the coupon image generating part 82 generates an coupon image on which the coupon amount is superimposed calculated by the coupon amount calculating part 86 (step B9).

Next, the margin area detecting part 83 detects a margin area larger than the coupon image generated by the coupon image generating part 82 from among the image data of the document read out by the document reading part 2. Then, the margin area detecting part 83 identifies the detected margin area as a superimposing area on which the coupon image is superimposed (step B10).

Next, the coupon image generating part 84 superimposes the coupon image generated by the coupon image generating part 82 on the superimposing area identified by the margin area detecting part 83 (step B11). Note that processing from step B6 to step B11 can be performed in parallel with the normal printing processing until (number of copies N−1)th copy. Accordingly, if the number of copies N is plural, a printing operation is started without waiting for reading of all pages of the document.

Next, the control part 8' performs a printing operation of the last Nth copy using the image data on which the coupon image is superimposed by the coupon image superimposing part 84 (step B12). After that, a discount coupon printing operation is ended.

Figure 8A:
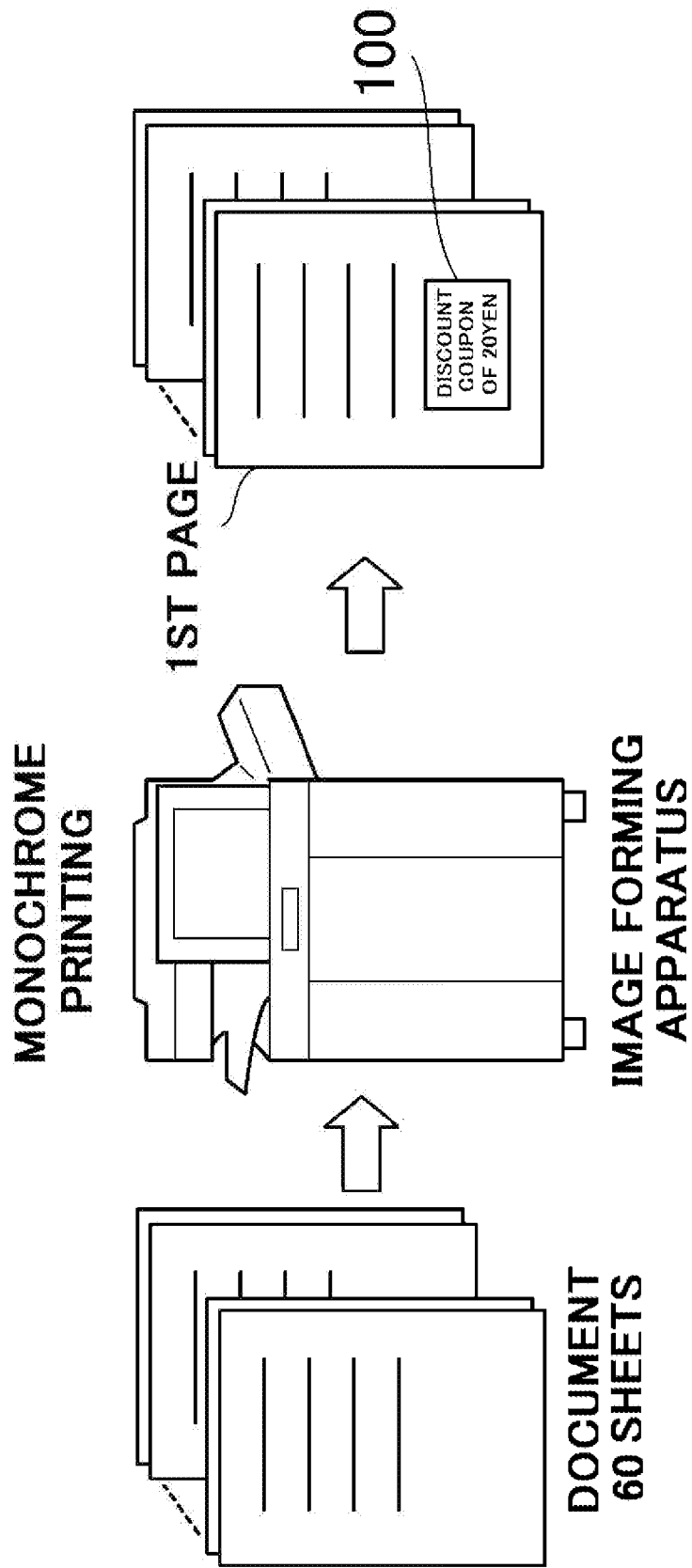
Figure 9A:
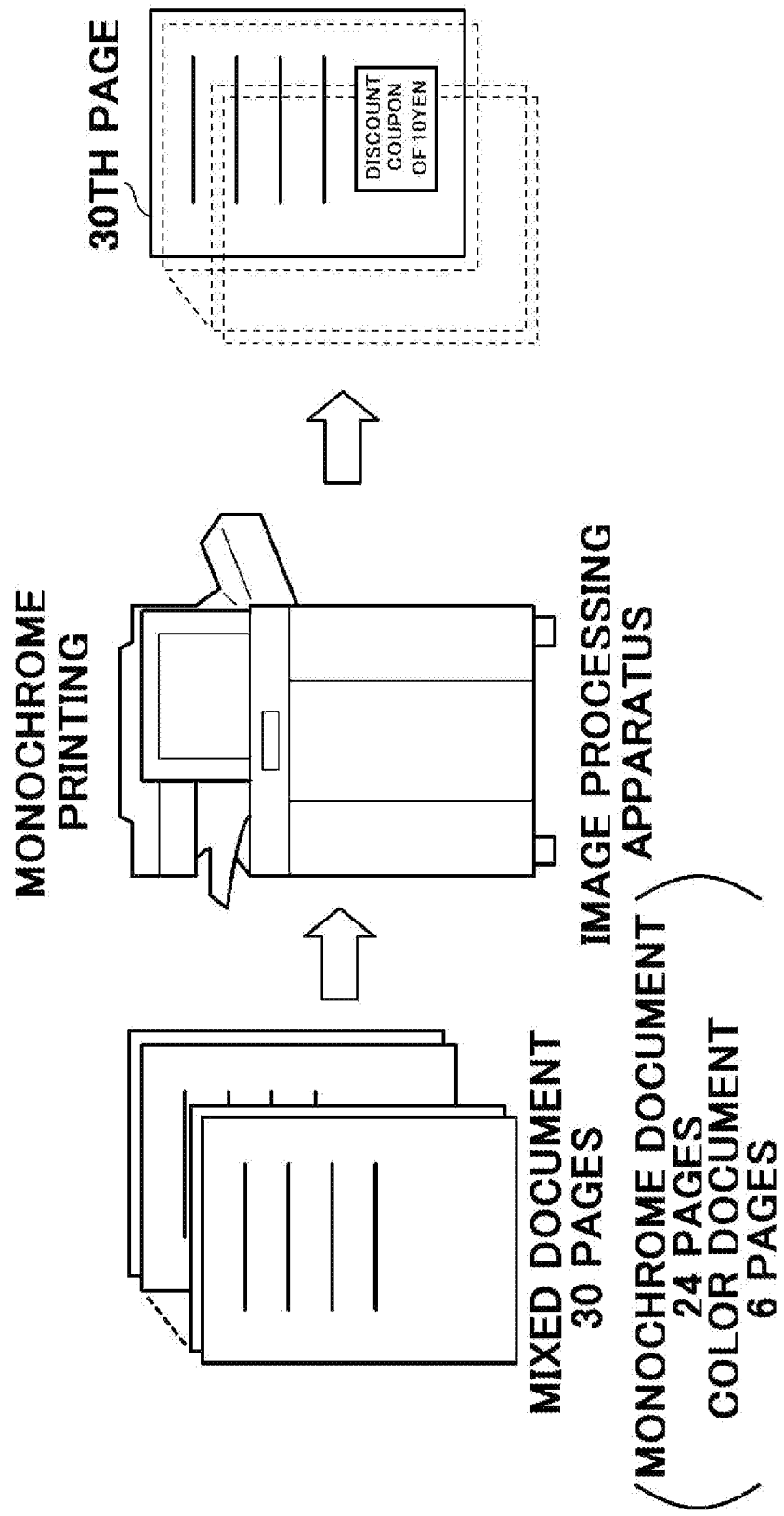

FIG. 8A shows a print example of the discount coupon in a case where when printing monochrome printing, a document is 60 pages, the number of copies N=1, and a margin area on a surface of page 1 is identified as a superimposing area. In this case, the discount amount is summed up, and the discount coupon 100 on which 20 yen that is a total discount amount is superimposed as a coupon amount on a surface of page 1. Therefore, a user easily grasp the presence of the discount coupon 100 without searching for a printed recording paper. This enhances convenience of the user.

FIG. 8B shows a print example of the discount coupon in a case where when performing monochrome printing, a document is 30 pages, the number of copies N=2, and a margin area on a surface of page 1 is identified as a superimposing area. In this case, the discount amount is summed up, and the discount coupon 100 on which 20 yen that is a total discount amount is superimposed on a surface of page 1 of 2nd copy. Therefore, when printing a plurality of copies, a user can receive benefits in accordance with the number of printing sheets, even if there is a copy on which a user don't want to print the discount coupon.

If the copy type is not monochrome printing but color printing in step B7, the image data analyzing part 8' sets the copy type to color. Then, the image data analyzing part 8' analyzes each of the color image data of all pages of the document read by the document reading part 2 (step B13). Then, the image data analyzing part 85 respectively determines whether the read document is either of a monochrome document or a color document. If the document is monochrome, the image data analyzing part 85 notifies the number of pages the coupon amount calculating part 86. Further, the image data analyzing part 85 converts color image data which is a monochrome document into monochrome (binary and gray scale) image data by the image processing part 10 (step B14).

Next, the coupon amount calculating part 86 calculates a total discount amount based on the total number of printing sheets and the coupon information 91. At the same time, the coupon amount calculating part 86 calculates a total return amount based on the number of pages of the monochrome document notified from the image data analyzing part 85 and the monochrome return information 92. After that, the coupon amount calculating part 86 calculates a total amount obtained by adding the total discount amount and the total return amount as a coupon amount (step B15), and processing proceeds to step B9.

FIG. 8C shows a print example of a discount coupon in a case where when performing color printing, a mixed document of 30 pages composed of a monochrome document of 24 pages and a color document of 6 pages, the number of copies N=1, and a surface of page 1 is identified as a superimposing area. In this case, a total discount amount amounts to 60 yen. At the same time, a total return amount amounts to 480 yen obtained by multiplying the monochrome document of 24 pages ×20 yen (monochrome return information 92), and a coupon amount amounts to 540 yen in total. Then, the discount coupon 100 on which 540 yen that is a coupon amount is superimposed is printed on a surface of page 1. This reduces part of the difference of the color printing and the monochrome printing. Therefore, it becomes easy for a user to select color as a copy type, thereby promoting the user of color. Further, the user can easily grasp the presence of the discount coupon 100 without searching for a printed recording paper. This enhances convenience of the user.

As described in the above, according to the second embodiment, the second embodiment provides the image forming apparatus 1' in which a charge for color printing is set to be higher than that of monochrome printing, and a discount amount is set every previously set number of printing sheets. The image forming apparatus 1' according to the second embodiment includes the operation part 5 that receives a setting input of copy type of monochrome or color, the document feeding part 3 that sequentially feeds a mounted document one by one, the document reading part 2 that reads the document fed by the document feeding part 3, the image data analyzing part 85 that analyzes the image data of the document read by the document reading part 2' if the copy type is set to color and determines whether or not the image data is a monochrome document, the coupon amount calculating part 86 that calculates a total discount amount based on the total number of printing sheets obtained by multiplying the number of copies received by the operation part 5 by the number of pages of the document, after all pages of the document are read by the document reading part 2, calculates a total return amount by multiplying all or part of amount of the difference between the charge for color printing and the charge for monochrome printing by the number of pages of the monochrome document grasped by determination of the image data analyzing part 85 and calculates a total amount obtained by adding the total printing sheets and the total return amount as a coupon amount, the coupon image generating part 82 that generates a coupon image on which the coupon amount is superimposed, the margin area detecting part 83 that detects a margin area larger than the coupon image from among the image data of the document read by the document reading part 2 and identifies the detected margin area as a superimposing area, and the coupon image superimposing part 84 that superimposes the coupon image on the superimposing area.

With this configuration, the image forming apparatus 1 according to the second embodiment issues a discount coupon by printing the image data of the document on which the coupon image is superimposed.

Further, with this configuration, since part of the difference between the color printing and the monochrome printing is returned, it becomes easy for a user to select color as a copy type. This promotes utilization of the color printing. Further, the user can easily grasp the presence of the discount coupon 100 without searching for a printed recording paper. This enhances convenience of the user.

As described in the above, according to the first and the second embodiments, the embodiments print the image data of the document on which the coupon image is superimposed on the last copy of the number of copies received by the operation part 5.

With this configuration, if the number of copies N is plural, a printing operation can be started without waiting for reading of all pages of the document.

Further, according to the first and the second embodiments, the margin area detecting part 83 continues to detect a margin area from 1st page toward the last page of the document, and identifies an initially detected margin area detected as a superimposing area.

Furthermore, the margin area detecting part 83 continues to detect a margin area from a 1st page toward the last page of the document in the order of a front surface and a back surface, and identifies an initially detected margin area as a superimposing area.

With this configuration, the margin area of the 1st page of the document is preferentially identified as the superimposing area. This allows a user to easily find the discount coupon 100.

Moreover, according to the first and the second embodiments, if a margin area after 2 page is identified as a superimposing area by the margin area detecting part 83, the coupon image generating part 82 generates a guidance notification image which is smaller than the coupon image on which a position of an identified superimposing area is written. Thereby, the coupon image superimposing part 84 superimposes the guidance notification image generated by the coupon image generating part 84 on the image data on a surface of the first page.

With this configuration, a user can easily grasp the presence and a printing position of the discount coupon 100 by the guidance notification 110.

It is obvious that the present disclosure is not necessarily limited to each of the above-mentioned embodiments, and each of the embodiments may be modified appropriately within the technical idea of the present disclosure. Also, the number, position, shape or the like of the components are not necessarily limited to the above-mentioned embodiments, and a preferable number, position, and shape or the like may be taken in carrying out the present disclosure.

What is claimed is:

1. An image forming apparatus in which a discount amount is set every previously set number of printing sheets, comprising:
    an operation part that receives an input of a number of print copies;
    a document feeding part that sequentially feeds a mounted document one by one;
    a document reading part that reads the document fed by the document feeding part;
    a discount amount calculating part that calculates a total number of printing sheets by multiplying the number of print copies received by the operation part by the number of pages of the document after the total number of pages of the document is read out by the document reading part, and calculates a total discount amount based on the calculated total number of printing sheets;
    a coupon image generating part that generates a coupon image on which the total discount amount is written;
    a margin area detecting part that detects a margin area larger than the coupon image from among image data of the document read out by the document reading part, and identifies the detected margin area as a superimposing area; and
    a coupon image superimposing part that superimposes the coupon image on the superimposing area, wherein
    a discount coupon is issued by printing the image data of the document on which the coupon image is superimposed;
    the margin area detecting part detects the margin area from a first page toward a last page of the document, and identifies an initially detected margin area as the superimposing area; and
    if the margin area after two pages is identified as the superimposing area by the margin area detecting part, the coupon image generating part generates a guidance display image which is smaller than the coupon image and indicates a position of the identified superimposing area, and the coupon image superimposing part superimposes the guidance display image generated by the coupon image generating part on image data of a first page surface.

2. The image forming apparatus according to claim 1, wherein the image data of the document on which the coupon image is superimposed is printed on the last copy of the number of print copies received by the operation part.

3. The image forming apparatus according to claim 1, wherein the margin area detecting part detects the margin area from a first page toward a last page of the document in the order of a front surface and a back surface, and identifies an initially detected margin area as the superimposing area.

4. An image forming apparatus in which a charge for color printing is set to be larger than a charge for monochrome printing, and a discount amount is set every previously set number of printing sheets, comprising:
    an operation part that receives a setting input of a copy type of monochrome or color;
    a document feeding part that sequentially feeds a mounted document one by one;
    a document reading part that reads the document fed by the document feeding part;
    an image data analyzing part that analyzes image data of the document read out by the document reading part, and determines whether or not the image data is a monochrome document if the copy type is set to color;
    a coupon amount calculating part that calculates a total discount amount based on the total number of printing sheets obtained by multiplying a number of print copies received by the operation part by the number of pages of the document, and calculates a total return amount by multiplying all or part of amount of the difference between a charge for color printing and a charge for monochrome printing by the number of pages of the monochrome document grasped by determination of the image data analyzing part, and calculates a total amount of the total discount amount and the total return amount as a coupon amount after all pages of the document are read out by the document reading part;

a coupon image generating part that generates a coupon image on which the coupon amount is written;

a margin area detecting part that detects a margin area larger than the coupon image from among image data of the document read out by the document reading part, and identifies the detected margin area as a superimposing area; and a coupon image superimposing part that superimposes the coupon image on the superimposing area, wherein a discount coupon is issued by printing image data of the document on which the coupon image is superimposed.

5. The image forming apparatus according to claim 4, wherein the image data of the document on which the coupon image is superimposed is printed on the last page of the number of print copies received by the operation part.

6. The image forming apparatus according to claim 4, wherein the margin area detecting part detects a margin area from a first page toward a last page of the document, and identifies an initially detected margin area as the superimposing area.

7. The image forming apparatus according to claim 4, wherein the margin area detecting part detects a margin area from a first page toward a last page of the document in the order of a front surface and a back surface, and identifies an initially detected margin area as the superimposing area.

* * * * *